(12) United States Patent
Kares (10) Patent No.: US 9,200,518 B2
(45) Date of Patent: Dec. 1, 2015

(54) AXIAL TURBINE WHEEL WITH CURVED LEADING EDGE

(71) Applicant: HONEYWELL INTERNATIONAL INC., Morristown, NJ (US)

(72) Inventor: Vaclav Kares, Strakonice (CZ)

(73) Assignee: Honeywell International Inc., Morristown, NJ (US)

( * ) Notice: Subject to any disclaimer, the term of this patent is extended or adjusted under 35 U.S.C. 154(b) by 36 days.

(21) Appl. No.: 14/062,843

(22) Filed: Oct. 24, 2013

(65) Prior Publication Data

US 2015/0113982 A1 Apr. 30, 2015

(51) Int. Cl.
| | |
|---|---|
| *F02B 33/44* | (2006.01) |
| *F01D 5/04* | (2006.01) |
| *F01D 5/14* | (2006.01) |
| *F02C 6/12* | (2006.01) |
| *F01D 25/24* | (2006.01) |
| *F02B 37/00* | (2006.01) |

(52) U.S. Cl.
CPC ............... *F01D 5/043* (2013.01); *F01D 5/141* (2013.01); *F01D 25/24* (2013.01); *F02B 37/00* (2013.01); *F02C 6/12* (2013.01); *F05D 2220/40* (2013.01); *F05D 2250/71* (2013.01)

(58) Field of Classification Search
CPC ............. F01D 1/04; F01D 1/20; F02B 37/00; F05D 2240/24; F05D 2240/30; F05D 2240/303; Y02T 10/144
USPC ........................................................ 60/605.1
See application file for complete search history.

(56) References Cited

U.S. PATENT DOCUMENTS

| 4,850,820 | A | 7/1989 | Gutknecht |
| 6,754,954 | B1 | 6/2004 | Decker |
| 2002/0185244 | A1* | 12/2002 | Decker et al. ................... 164/35 |
| 2004/0223840 | A1 | 11/2004 | Vogiatzis et al. |
| 2005/0106013 | A1 | 5/2005 | Ghizawi |
| 2011/0252790 | A1* | 10/2011 | Lotterman et al. ........... 60/605.1 |
| 2012/0301287 | A1 | 11/2012 | Swiatek et al. |

FOREIGN PATENT DOCUMENTS

| DE | 102012102186 A1 | 9/2013 |
| EP | 2 378 099 A2 | 10/2011 |

OTHER PUBLICATIONS

EPO "Communication" including a European Search Report, for counterpart European Application No. EP 14186709.3, dated Mar. 24, 2015.

* cited by examiner

*Primary Examiner* — Audrey K Bradley
(74) *Attorney, Agent, or Firm* — The Law Office of John A. Griecci (57) ABSTRACT

A turbocharger including a turbine wheel having a hub-to-tip ratio of no more than 60% and blades with a high turning angle and a curved leading edge, a turbine housing forming an inwardly spiraling primary-scroll passageway that significantly converges to produce highly accelerated airflow into the turbine at high circumferential angles, and a two-sided parallel compressor. The compressor and turbine each produce substantially no axial force, allowing the use of minimal axial thrust bearings.

4 Claims, 9 Drawing Sheets

AXIAL TURBINE WHEEL WITH CURVED LEADING EDGE

The present invention relates generally to turbochargers and, more particularly, to an axial turbine having a low hub to tip ratio and a curved leading edge.

BACKGROUND OF THE INVENTION

Figure 1:
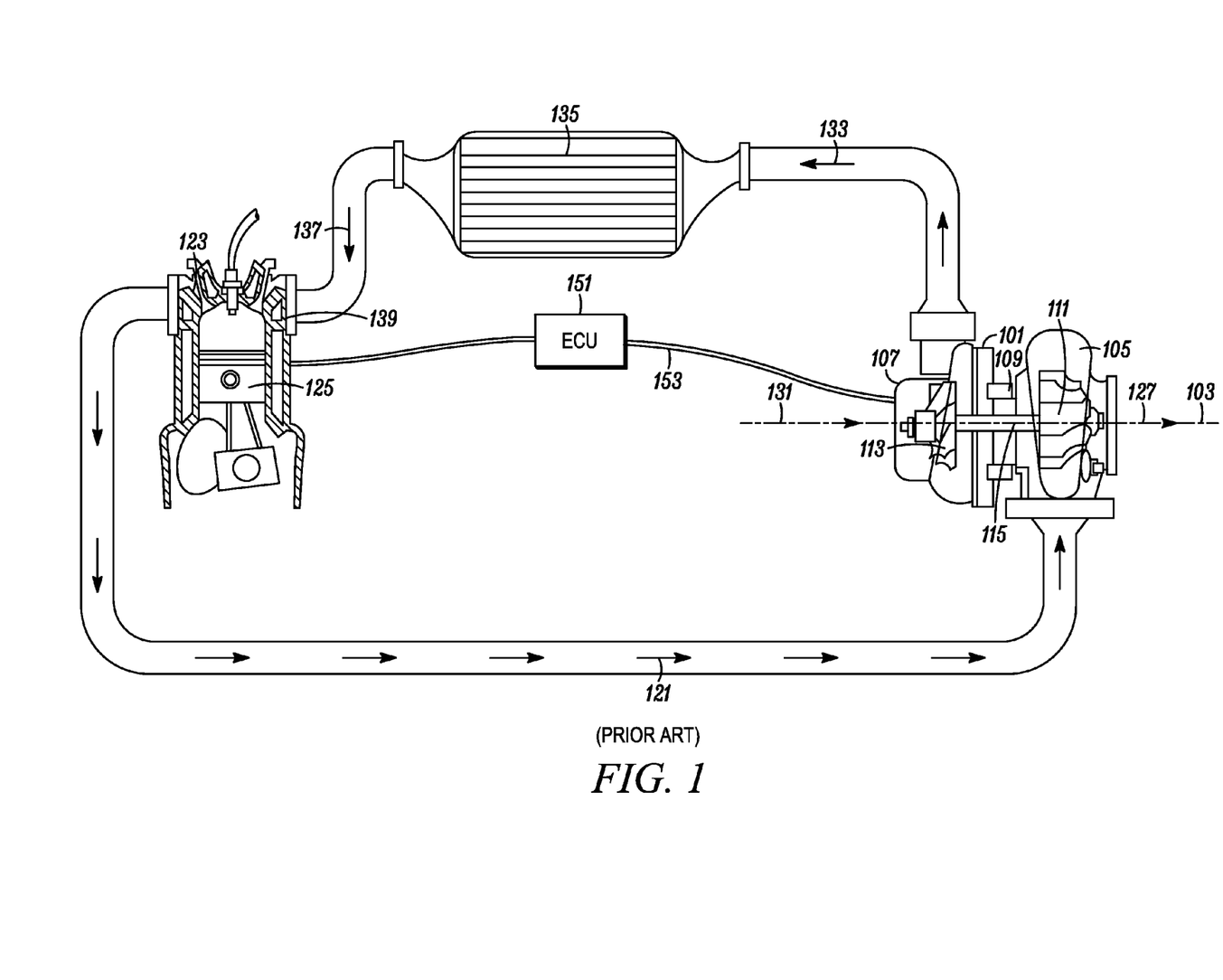
FIG. 1 is a system view of a prior art turbocharged internal combustion engine.

With reference to FIG. 1, a typical turbocharger 101 having a radial turbine includes a turbocharger housing and a rotor configured to rotate within the turbocharger housing along an axis of rotor rotation 103 on thrust bearings and two sets of journal bearings (one for each respective rotor wheel), or alternatively, other similarly supportive bearings. The turbocharger housing includes a turbine housing 105, a compressor housing 107, and a bearing housing 109 (i.e., a center housing that contains the bearings) that connects the turbine housing to the compressor housing. The rotor includes a turbine wheel 111 located substantially within the turbine housing, a compressor wheel 113 located substantially within the compressor housing, and a shaft 115 extending along the axis of rotor rotation, through the bearing housing, to connect the turbine wheel to the compressor wheel.

The turbine housing 105 and turbine wheel 111 form a turbine configured to circumferentially receive a high-pressure and high-temperature exhaust gas stream 121 from an engine, e.g., from an exhaust manifold 123 of an internal combustion engine 125. The turbine wheel (and thus the rotor) is driven in rotation around the axis of rotor rotation 103 by the high-pressure and high-temperature exhaust gas stream, which becomes a lower-pressure and lower-temperature exhaust gas stream 127 and is axially released into an exhaust system (not shown).

The compressor housing 107 and compressor wheel 113 form a compressor stage. The compressor wheel, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature over that of the input air.

Optionally, the pressurized air stream may be channeled through a convectively cooled charge air cooler 135 configured to dissipate heat from the pressurized air stream, increasing its density. The resulting cooled and pressurized output air stream 137 is channeled into an intake manifold 139 on the internal combustion engine, or alternatively, into a subsequent-stage, in-series compressor. The operation of the system is controlled by an ECU 151 (engine control unit) that connects to the remainder of the system via communication connections 153.

Figure 2:
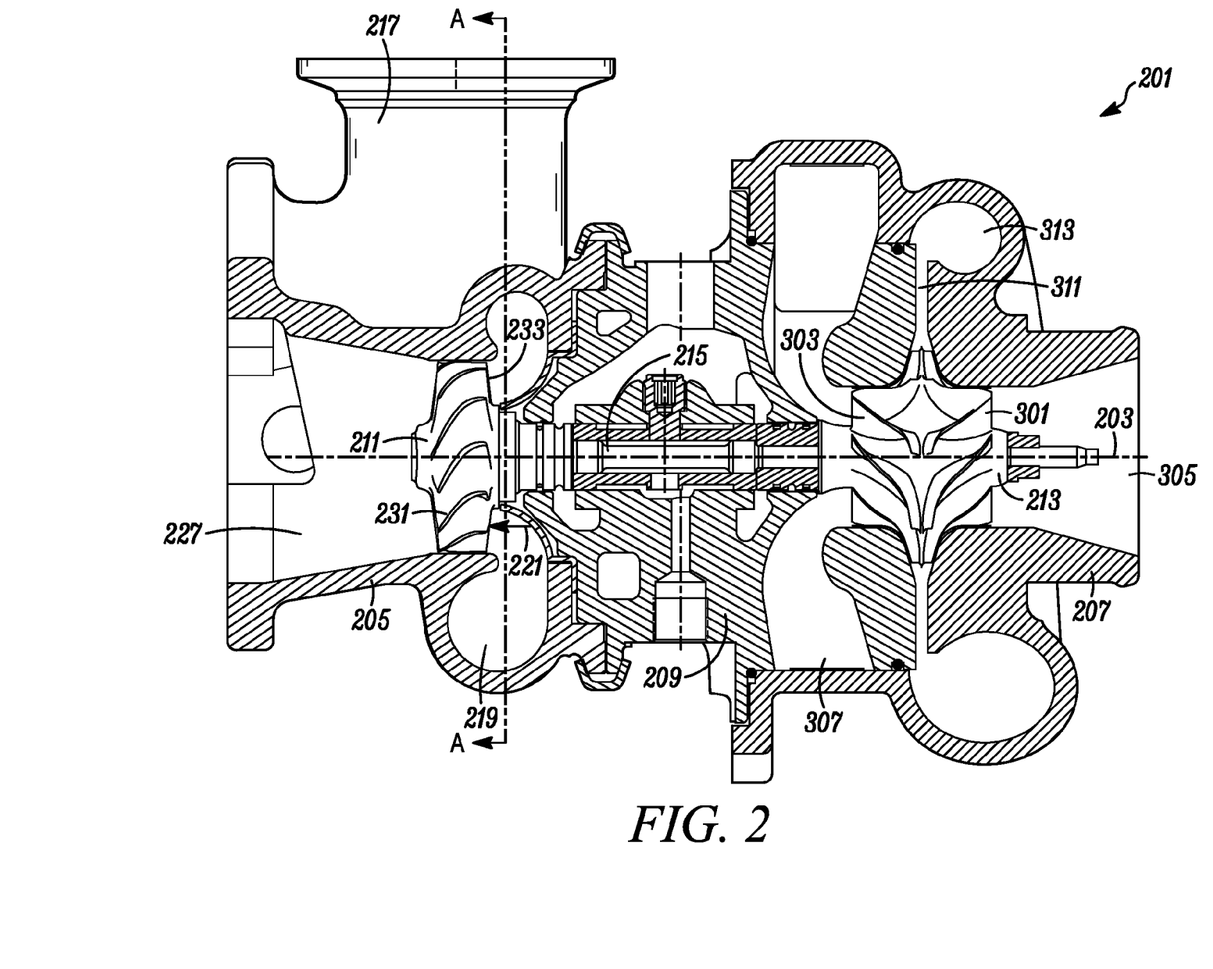
FIG. 2 is a cross-sectional plan view of a turbocharger embodying the present invention.

U.S. Pat. No. 4,850,820, dated Jul. 25, 1989, which is incorporated herein by reference for all purposes, discloses a turbocharger similar to that of FIG. 1, but which has an axial turbine. The axial turbine inherently has a lower moment of inertia, reducing the amount of energy required to accelerate the turbine. As can be seen in FIG. 2, the turbine has a scroll that circumferentially receives exhaust gas at the radius of the turbine blades and (with reference to FIG. 1) axially restricts the flow to transition it to axial flow. It thus impacts the leading edge of the turbine blades in a generally axial direction (with reference to col. 2).

For many turbine sizes of interest, axial turbines typically operate at higher mass flows and lower expansion ratios than comparable radial turbines. While conventional axial turbines generally offer a lower inertia, albeit with some loss of efficiency and performance, they suffer from an inability to be efficiently manufactured in the small sizes usable with many modern internal combustion engines. This is, e.g., due to the exceptionally tight tolerances that would be required, due to aerodynamic limitations, and/or due to dimensional limitations on creating small cast parts. Axial turbines also lack the ability to perform well at higher expansion ratios, such as are typically needed due to the pulsing nature of the exhaust of an internal combustion engine. Furthermore, conventional axial turbines have a significant change in static pressure across the blades, causing significant thrust loads on the thrust bearings of the rotor, and potentially causing blowby.

In some conventional turbochargers the turbines and compressors are configured to exert axial loads in opposite directions so as to lessen the average axial loads that must be carried by the bearings. Nevertheless, the axial loads from the turbines and compressors do not vary evenly with one another and may be at significantly different levels, so the thrust bearings must be designed for the largest load condition that may occur during turbocharger use. Bearings configured to support high axial loads waste more energy than comparable low-load bearings, and thus turbochargers that must support higher axial loads lose more energy to their bearings.

Accordingly, there has existed a need for a turbocharger turbine having a low moment of inertia, and characterized by a small size that does not require exceptionally tight tolerances, while having reasonable efficiency both at both lower and higher expansion ratios, and smaller axial loads. Preferred embodiments of the present invention satisfy these and other needs, and provide further related advantages.

SUMMARY OF THE INVENTION

In various embodiments, the present invention solves some or all of the needs mentioned above, typically providing a cost effective turbocharger turbine characterized by a low moment of inertia, and having a small size that does not require exceptionally tight tolerances, while operating at reasonable efficiency levels at both at both lower and higher expansion ratios, and having only small changes in static loads.

The invention provides a turbocharger configured to receive an exhaust gas stream from an engine configured to operate over a range of standard operating conditions, and to compress input air into a pressurized air stream. Embodiments of the invention will typically comprise a turbocharger housing including a turbine housing, and a rotor configured to rotate within the turbocharger housing along an axis of rotation. The rotor includes an axial turbine wheel, a compressor wheel, and a shaft extending along the axis of rotation and connecting the turbine wheel to the compressor wheel.

The turbine wheel is configured with a hub, and with a plurality of axial turbine blades configured to drive the rotor in rotation around the axis of rotation when the turbocharger receives the exhaust gas stream from the engine. Each blade has an axial leading edge (i.e., an axially upstream edge), an axial trailing edge (i.e., an axially downstream edge), a hub end, and a tip end opposite the hub end. The axial leading edge of each blade is characterized by a leading edge curvature near the hub end. The leading edge curvature includes a first curve (an axial downstream curvature component) defining an axial clipping of the axial leading edge. The leading edge curvature also may include a second curve (a circumferential curvature component), forming a non-radial turn of the axial leading edge. Advantageously, the leading edge curvature may allow for the turbine wheel to be a cast part when having a leading-edge direction angle that varies significantly over the span of the blade.

The compressor wheel is configured to compress input air into the pressurized air stream. Advantageously, the turbine housing forms an inwardly spiraling turbine primary-scroll passageway characterized by a significant enough radial reduction to accelerate exhaust gas such that a significant portion of the total pressure of the exhaust gas received by the turbine is converted into dynamic pressure. This allows an appropriately configured blade to extract a significant amount of energy from the exhaust gas without significantly changing the static pressure across the turbine blades. With a substantially unchanged static pressure across the turbine blades, the exhaust gas stream applies little to no axial pressure on the rotor.

The axial trailing edge is characterized by a radius at the hub end and a radius at the tip end. A feature of the invention is that the radius at the hub end of the turbine wheel axial trailing edge is no more than 60% of the radius of the tip end of the turbine wheel axial trailing edge. Further features include that the turbine wheel blades are limited to 16 or less in number, and are each characterized by a large turning angle.

Advantageously, these features provide for the extraction of a significant amount of energy from high-speed exhaust gas received in a highly circumferential direction without significantly impacting the static pressure of the gas. Furthermore, the turbine wheel does not require extremely tight manufacturing tolerances or small blade sizes, even when the wheel is manufactured in relatively small sizes.

The invention further features that the compressor may be a two-sided, parallel, radial compressor including a compressor wheel with back-to-back oriented impeller blades including a first set of impeller blades facing axially away from the turbine and a second set of impeller blades facing axially toward the turbine. The compressor housing is configured to direct inlet air to each set of compressor blades in parallel. Advantageously, under this feature, the compressor is configured to produce substantially no axial load on the rotor. In combination with a turbine that also produces little or no axial load on the rotor, thrust bearing load levels can be significantly lower than in conventional turbochargers. The lower bearing load levels allow for the use of a more efficient thrust bearing, and thus increase the resulting overall efficiency of the turbocharger.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in a motor vehicle equipped with a gasoline powered internal combustion engine ("ICE") and a turbocharger. The turbocharger is equipped with a unique combination of features that may, in various embodiments, provide the aerodynamic benefits of a zero reaction turbine with the geometric benefits of a fifty percent reaction turbine, and/or provide significantly improved system efficiencies by combining less efficient components in a manner that reduces the bearing requirements, and thereby forms a system with a higher efficiency than the comparable unimproved system.

The turbine is configured to operate at reasonable efficiency levels at both lower and higher expansion ratios, having only small changes in static pressure across the turbine wheel (and thereby low rotor thrust loads), while it has a low moment of inertia, and is characterized by a small size, but does not require exceptionally tight tolerances. In combination with this, the compressor is also characterized by low axial thrust loads, providing for the turbocharger to require a thrust bearing that is significantly more efficient than is used in comparable conventional turbochargers.

Figure 3:
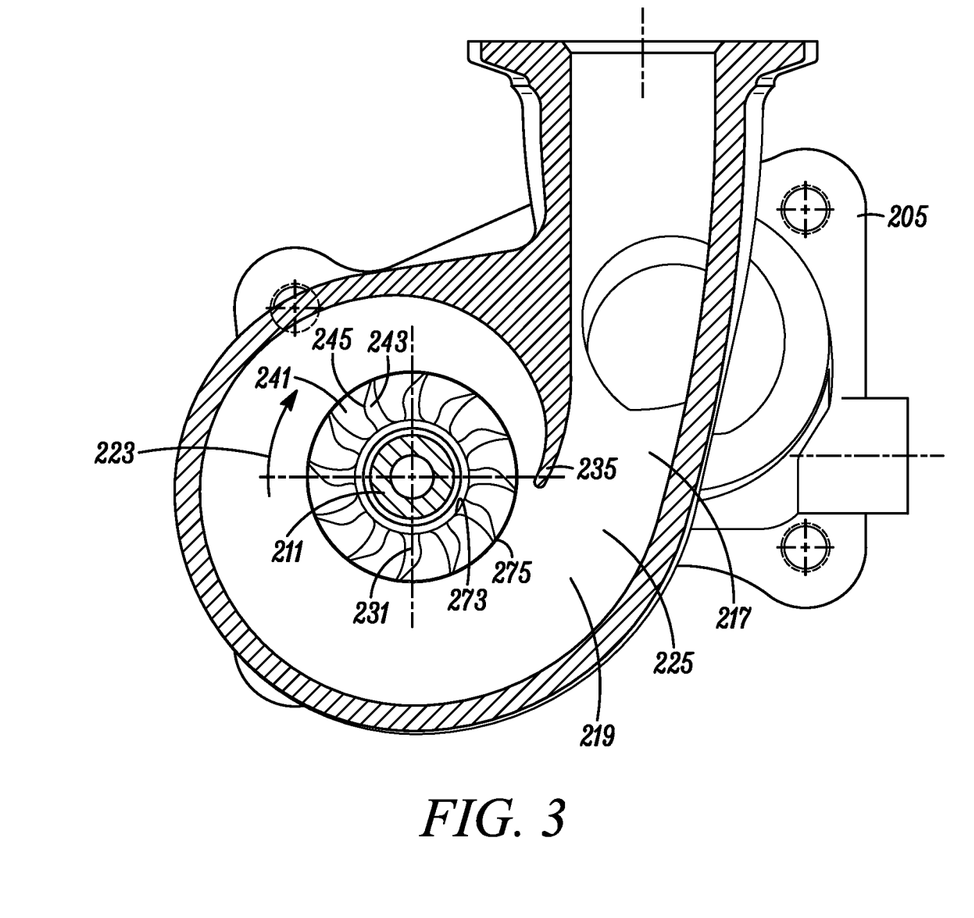
FIG. 3 is a cross-sectional side view of the turbocharger depicted in FIG. 2, taken along line A-A of FIG. 2.

With reference to FIGS. 2 & 3, in a first embodiment of the invention a typical internal combustion engine and ECU (and optionally an intercooler), such as are depicted in FIG. 1, are provided with a turbocharger 201 that includes a turbocharger housing and a rotor configured to rotate within the turbocharger housing along an axis of rotor rotation 203 on a set of bearings. The turbocharger housing includes a turbine housing 205, a compressor housing 207, and a bearing housing 209 (i.e., a center housing that contains radial and thrust bearings) that connects the turbine housing to the compressor housing. The rotor includes an axial turbine wheel 211 located substantially within the turbine housing, a radial compressor wheel 213 located substantially within the compressor housing, and a shaft 215 extending along the axis of rotor rotation, through the bearing housing, to connect the turbine wheel to the compressor wheel and provide for the turbine wheel to drive the compressor wheel in rotation around the axis of rotation.

The turbine housing 205 and turbine wheel 211 form a turbine configured to circumferentially receive a high-pressure and high-temperature exhaust gas stream from an exhaust manifold of the engine (such as the exhaust gas stream 121 from the exhaust gas manifold 123, as depicted in FIG. 1). The turbine wheel (and thus the rotor) is driven in rotation around the axis of rotor rotation 203 by the high-pressure and high-temperature exhaust gas stream acting on a plurality of blades 231 of the turbine wheel. The exhaust gas stream becomes a lower total pressure exhaust gas stream while passing through the blades, and is subsequently axially released via a turbine outlet 227 into an exhaust system (not shown).

The compressor housing 207 and compressor wheel 213 form a radial compressor. The compressor wheel, being driven in rotation by the exhaust-gas driven turbine wheel 211 (via the shaft 215), is configured to compress axially received input air (e.g., ambient air, or already-pressurized air from a previous-stage in a multi-stage compressor) into a pressurized air stream that may be ejected circumferentially from the compressor and sent on to an engine inlet (such as pressurized air stream 133 that is sent on to the engine inlet 139, as depicted in FIG. 1).

Turbine Volute

The turbine housing 205 forms an exhaust gas entrance passageway 217 leading into a primary-scroll passageway 219 configured to receive the exhaust gas stream from the engine in a direction normal to and radially offset from the rotor axis of rotation 203. The primary-scroll passageway forms a spiral adapted to significantly accelerate the speed of the gas stream to a high speed, which may be a supersonic speed for at least some operating conditions of the turbine (and its related engine). More particularly, the primary-scroll passageway turns the exhaust gas both inwardly around the axis of rotation 203 and axially toward the axial turbine wheel 211, thereby achieving (for some standard operating conditions of the engine) a supersonic flow having both a downstream axial component 221 and a downstream circumferential component 223.

Effectively, this configuration takes advantage of the conservation of angular momentum (rather than a convergent divergent nozzle) to achieve a high-speed airflow that may include a shockless transition to supersonic speeds for at least some operating conditions. Typically, a spiral characterized by a large radius change is required to achieve this change in velocity, and even though the resulting airstream is turned axially into an axial turbine wheel, it has a very high-speed circumferential component.

This circumferential component is achieved without the use of turning vanes, which would cause additional losses. Thus, the turbine inlet of this embodiment is of a vaneless design. As compared to a design with vanes, such a design advantageously is cost efficient, reliable (in that it eliminates parts from an environment in which they are likely to erode), avoids friction pressure losses, and avoids establishing a critical throat area that could choke the flow in some operating conditions.

Figure 4:
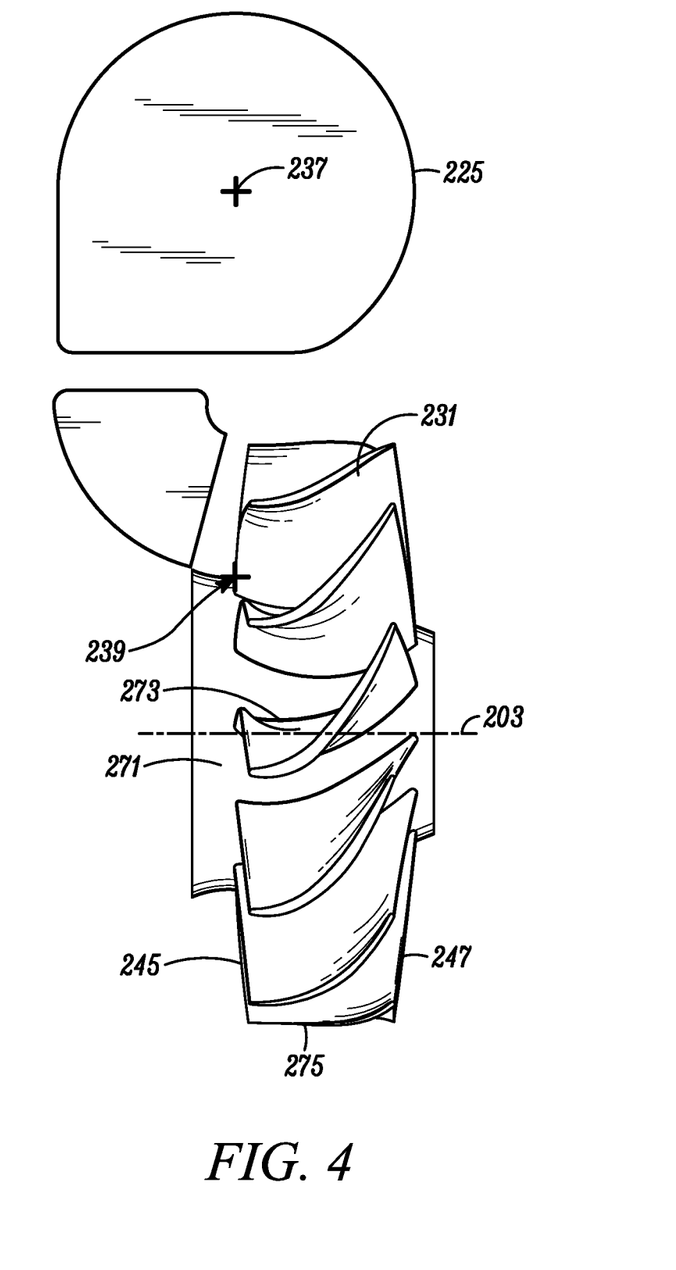
FIG. 4 is a plan view of certain critical flow locations relative to a turbine wheel depicted in FIG. 2.

With reference to FIGS. 2-4, this potentially supersonic flow of the accelerated exhaust gas stream in the inner radius of the primary-scroll passageway is directed into the turbine wheel 211. More particularly, the primary-scroll passageway is an inwardly spiraling passageway characterized by a primary-scroll inlet port 225 that connects the primary-scroll passageway to the exhaust gas entrance passageway 217. The primary-scroll passageway substantially forms a convergent passageway that spirals inward enough and converges enough to accelerate the exhaust gas, and to achieve supersonic speeds for at least some standard operating conditions of the engine (and thus of the turbocharger) as the exhaust gas turns axially downstream and impinges on the axially upstream end 233 of the blades 231.

The primary-scroll inlet port 225 is a planar location located along the passageways within the turbine that the exhaust gas travels through prior to reaching the turbine wheel. The location of the primary-scroll inlet port is defined relative to an opening in the passageway, which is characterized by a tongue-like shape when viewed in a cross-section taken normal to the rotor axis of rotation 203.

More particularly, the structure of a tongue 235 appears as a protrusion having a tip when viewed in the cross-section of FIG. 3. It should be noted that in some embodiments this structure will not vary in shape when the cross section is taken at different axial locations. In other embodiments the structure forming the tongue 235 may be shaped such that the location of the tip of the tongue varies when viewed in cross-sections taken at different axial locations.

The primary-scroll inlet port 225 is located at the tip of the tongue 235. To any extent that the circumferential location of the tip of the tongue appears to vary with the axial location of the cross-section considered, the primary-scroll inlet port 225 is defined to be at the most upstream location of the tip of the tongue, i.e., the upstream-most location at which the housing opens such that it is no longer radially interposed between the exhaust gas stream and the blades (even though the blades are axially offset from the exhaust gas stream). For the purposes of this application, the primary-scroll inlet port 225 is defined as the smallest planar opening from the exhaust gas entrance passageway 217 into the primary-scroll passageway 219, at the tip of the tongue. In other words, it is at the downstream end of the exhaust gas entrance passageway at the location at which the stream opens up to the blades.

The primary-scroll passageway 219 starts at the primary-scroll inlet port 225, and spirals inward 360 degrees around the axis of rotation to form a converging loop that rejoins flow coming in the primary-scroll inlet port 225. This convergent loop accelerates the exhaust gas circumferentially and turns it axially. Throughout the 360 degrees of the primary-scroll passageway 219, the accelerated and turned exhaust gas stream impinges on the blades 231, passing between the blades and driving the turbine wheel 211 in rotation.

In summary, the housing for the axial turbine wheel forms an inwardly spiraling primary-scroll passageway that surrounds the axis of rotor rotation. It begins at a primary-scroll inlet port 225 that is substantially radially external to the axially upstream ends of the blades, providing for the passageway to spiral inwardly and turn axially to accelerate the exhaust gas flow into the upstream ends of the axial turbine wheel blades.

Corrected Mass Flow

To provide for an adequate level of acceleration of the exhaust gas under the invention, the primary-scroll passageway 219 is configured with sizing parameters such that the corrected mass flow rate surface density of the turbine, when operated at a critical expansion ratio ($E_{cr}$), exceeds a critical configuration parameter, i.e., a critical corrected mass flow rate surface density ($D_{cr}$). More particularly, the sizing parameters for the scroll include a primary-scroll radius ratio ($r_r$) and a primary-scroll inlet port area ($a_i$), and are selected such that the corrected mass flow rate surface density of the turbine exceeds the critical configuration parameter $D_{cr}$ when the turbine is operated at the critical expansion ratio $E_{cr}$. These sizing parameters are defined relative to the primary-scroll inlet port 225, which is characterized by a centroid 237. For the gas to be axially adequately accelerated, this centroid will be substantially radially external to, and typically axially upstream of, an axially upstream end 233 of each blade 231.

The values of some of the above-recited terms are dependent upon the type of exhaust stream gas that will be driving the turbine. This exhaust-stream gas will be characterized by a Boltzmann Constant (k), and by a Gas Constant R-specific ($R_{sp}$). These constants vary by gas type, but for most gasoline powered engine exhaust gasses, the difference is anticipated to be small, with the constants being typically be on the order of k=1.3 and $R_{sp}$=290.8 J/kg/K.

The turbine housing has an ability to accelerate the exhaust gas that is characterized by the two sizing parameters recited above. The first sizing parameter, being the primary-scroll radius ratio $r_r$ is defined to be a radius of a point 239 at the hub at the axial leading edge of the turbine blades 231 (i.e., at the inner edge of the rotor inlet), divided by a radius of the centroid 237 of the planar area of the primary-scroll inlet port 225. The second, being the primary-scroll inlet port area $a_i$ is defined to be the area of the primary-scroll inlet port 225.

As mentioned above, the geometry of this embodiment of a turbine is defined relative to operational parameters at the critical expansion ratio $E_{cr}$. This critical expansion ratio is obtained from the formula $$E_{cr} = \left(\frac{k+1}{2}\right)^{\left(\frac{k}{k-1}\right)}$$

and is a function of the gas-specific Boltzmann's Constant k. A typical value for $E_{cr}$ is 1.832.

As recited above, the dimensions of the primary-scroll passageway 219 of this embodiment are limited by a primary-scroll radius ratio $r_r$ and a primary-scroll inlet port area $a_i$ that cause the corrected mass flow rate surface density of the turbine to exceed the critical corrected mass flow rate surface density $D_{cr}$. This critical corrected mass flow rate surface density is obtained from the formula $$D_{cr} = r_r \frac{101325}{\sqrt{288 \, R_{sp}}} \left(1 - \frac{(k-1)(r_r)^2}{(k+1)}\right)^{\left(\frac{1}{k-1}\right)} \sqrt{\frac{2k}{k+1}}$$

which varies with the primary-scroll radius ratio $r_r$.

For any given turbine, exactly one steady-state inlet condition for a given outlet static pressure (i.e., one inlet total pressure) will drive the turbine at a given expansion ratio such as the critical expansion ratio $E_{cr}$. A variation in the geometry of the volute, e.g., a variation of the radius ratio $r_r$ and/or the primary-scroll inlet port area $a_i$ can vary the steady-state mass flow rate that will drive the turbine at the given critical expansion ratio, and thus will affect the related corrected mass flow rate surface density.

If the primary-scroll radius ratio and the primary-scroll inlet port area are adequately selected, it will cause the corrected mass flow rate surface density at the primary-scroll inlet port 225 when driven at the critical expansion ratio $E_{cr}$ to be greater than the critical corrected mass flow rate surface density $D_{cr}$. While the relationships between the primary-scroll radius ratio, the primary-scroll inlet port area and the corrected mass flow rate surface density at the primary-scroll inlet port are complicated, and while they will typically be explored experimentally, it may be noted that in general, a higher radius ratio for the same port area will lead to a higher corrected mass flow rate surface density.

In an iterative method of designing a turbine under the invention, a person skilled in the art can first select a composition of an exhaust gas to be received from an engine, look up (from existing sources of gas properties) the related Boltzmann's Constant k and Gas Constant $R_{sp}$, and calculate the critical expansion ratio $E_{cr}$.

A first configuration of a turbine is then designed. The turbine includes a volute as described above, with an inwardly spiraling passageway that turns from a tangential direction to an axial direction, and an axial turbine wheel. The design is characterized by a first primary-scroll radius ratio $r_{r1}$ and a first primary-scroll inlet port area $a_{i1}$.

A prototype is built, put on a gas stand, and run using the selected exhaust gas. The input total pressure is increased until a calculated expansion ratio reaches the critical expansion ratio $E_{cr}$. This expansion ratio is calculated from the total pressure at the inlet and the static pressure at the outlet. A steady state mass flow rate m, a total turbine inlet temperature T, and a total inlet pressure $p_i$ are measured.

The corrected mass flow rate surface density is calculated from the measured data using the following formula:

$$D_{ca} = \frac{m \times \sqrt{\frac{T}{288}}}{\frac{p_i \times a_i}{101325}}$$

where $a_i$ is the inlet port area. This calculated corrected mass flow rate surface density $D_{ca}$ is compared to the critical corrected mass flow rate surface density $D_{cr}$, which is calculated using the previously-identified formula. If the corrected mass flow rate surface density exceeds or equals the critical corrected mass flow rate surface density, then the design of an embodiment of the invention is complete. If the corrected mass flow rate surface density is less than the critical corrected mass flow rate surface density, then the design is considered insufficient to create the high-speed circumferential airflow needed under the invention, and another iteration of the design and testing steps are completed.

In this next iteration, the primary-scroll radius ratio $r_r$ and/or the primary-scroll inlet port area $a_i$ are appropriately adjusted (e.g., reduced) to increase the corrected mass flow rate surface density when taken at the critical expansion ratio $E_{cr}$. This process is repeated until a design is found in which the corrected mass flow rate surface density exceeds or equals the critical corrected mass flow rate surface density when taken at the critical expansion ratio $E_{cr}$.

In a potential alternative decision-making process for the above recited iterative design method, the decision to change one or both of the sizing parameters $r_r$ and $a_i$ is based on testing the axial loading of the turbine wheel (or the static pressure ratios that cause axial loading) by the exhaust gasses, over critical operating conditions (i.e., conditions that cause operation to occur at the critical expansion ratio $E_{cr}$). Another iteration is conducted if the axial forces are not below a threshold, such as the loading condition when the static pressure upstream of the wheel near the wheel hub is greater than 120% of the turbine outlet static pressure, i.e. the pressures differ at the most by 20% of the outlet pressure.

Wheel Blades

Figure 5:
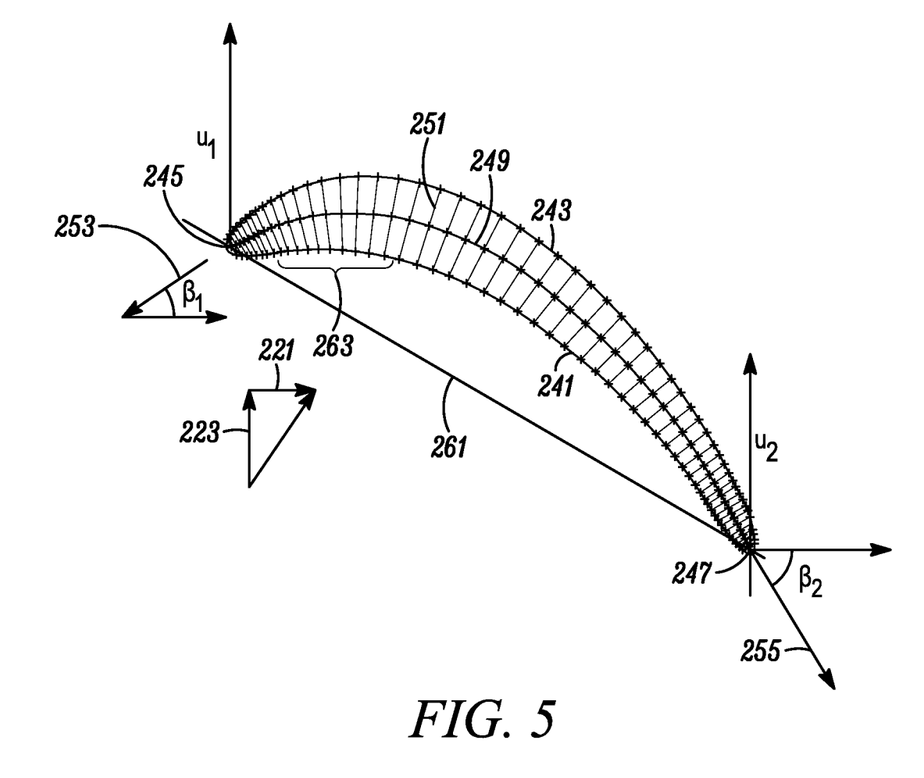
FIG. 5 is a depiction of the camber of a turbine blade depicted in FIG. 2.

With reference to FIGS. 3-5, relative to the downstream axial flow component 221 and downstream circumferential flow component 223, each blade 231 is characterized by a lower surface 241 (i.e., the surface generally facing circumferentially into the downstream circumferential flow component) and an upper surface 243 (i.e., the surface generally facing circumferentially away from the downstream circumferential component).

The lower and upper surfaces of the blade 231 meet at an axial leading edge 245 (i.e., the upstream edge of the blade) and an axial trailing edge 247 (i.e., the downstream edge of the blade). The blades extend radially outward from a central hub 271 in a cantilevered configuration. They attach to the hub along a radially inner hub end 273 of the blade, and extend to a radially outer tip end 275 of the blade. The hub end of the blade extends from an inner, hub end of the axial leading edge to an inner, hub end of the axial trailing edge. The tip end of the blade extends from an outer, tip end of the axial leading edge to an outer, tip end of the axial trailing edge.

Typical axial turbines are typically provided with blades having blade lengths that are very small compared to the radius of the respective hub. Contrary to this typical convention, the present embodiment is provided with blades having a hub-to-tip ratio of less than or equal to 0.6 (i.e., the radius of the inner, hub end of the axial trailing edge is no more than 60% of the radius of the outer, tip end of the axial trailing edge).

While convention axial blades having high hub-to-tip ratios also require large numbers of blades to extract any significant amount of energy from the exhaust, the present blades are capable of extracting a very high percentage of the dynamic pressure of the high-speed highly tangential flow entering the turbine wheel. They can do so with a relatively limited number of blades, thereby limiting the rotational moment of inertia of the turbine wheel, and therefore providing for fast transient response time. Under numerous embodiments of the invention there are 20 or fewer blades, and for many of those embodiments there are 16 or fewer blades.

At any given radial location along the blade, the lower and upper surfaces are each characterized by a camber, and the blade is characterized by a median camber, which for the purposes of this application will be defined as a median camber curve 249 extending from the axial leading edge to the axial trailing edge at a median location equally between the upper and lower surfaces, wherein the median location is taken along a lines 251 extending from the upper camber to the lower camber, normal to the curve 249 along the median camber curve.

The median camber curve 249 comes to a first end at the axial leading edge 245. The direction of the median camber curve at the axial leading edge defines a leading-edge direction 253, and is characterized by a leading-edge direction angle $\beta_i$ (i.e., a $\beta_1$ blade angle) that is the angular offset between the leading-edge direction and a line that is parallel to the axis of rotation and passing through the axial leading edge (at the same radial location as the median camber), and therefore also to the downstream axial component 221 of the supersonic flow. The $\beta_1$ blade angle is positive when the axial leading edge turns in to the circumferential flow component 223 (as depicted in FIG. 5), and zero when the axial leading edge faces directly along the axial flow component 221. The $\beta_1$ blade angle can vary over the radial extent of the axial leading edge.

The median camber curve 249 comes to a second end at the axial trailing edge 247. The direction of the median camber curve at the axial trailing edge defines a trailing-edge direction 255, and is characterized by a trailing-edge direction angle $\beta_2$ (i.e., a $\beta_2$ blade angle) that is the angular offset between the trailing-edge direction and a line that is parallel to the axis of rotation and passing through the axial trailing edge (at the same radial location as the median camber). The $\beta_2$ blade angle is positive when the axial trailing edge turns in to the circumferential flow component 223 (as depicted in FIG. 5), and zero when the axial trailing edge faces directly along the axial flow component 221. The blade angle $\beta_2$ can vary over the radial extent of the axial trailing edge.

The sum of the $\beta_1$ and $\beta_2$ blade angles at a given radial location on a blade defines a turning angle for the blade at that radial location. The $\beta_1+\beta_2$ turning angle can vary over the radial extent of the blade.

While the primary scroll efficiently accelerates the exhaust gas stream and thereby provides for a substantial increase in the dynamic pressure of the exhaust gas stream, it does not typically produce a flow with a high degree of axial uniformity, as might be seen from a vaned nozzle. The blades of the present embodiment, and particularly the shapes of their axial leading edges, are tailored so that each radial portion of the blade is best adapted to the flow that occurs at its radial location. This type of tailoring is not typical for conventional axial turbines, as they typically have vaned nozzles providing a high level of flow uniformity, and as they have a much higher hub-to-tip ratio that limits possible variations between the hub and tip flows.

Under the present embodiment, over the majority of the axial leading edge of each blade, the blade angle faces circumferentially upstream with respect to the axis of rotation (i.e., the $\beta_1$ blade angle is positive). Moreover, the $\beta_1$ blade angle is greater than or equal to 20 degrees (and possibly greater than or equal to 30 degrees) at both the hub end of the axial leading edge and the mid-span of the axial leading edge (i.e., the axial leading edge half way between its hub end and its shroud end). At the shroud end of the axial leading edge, the $\beta_1$ blade angle is greater than or equal to −20 degrees (and possibly greater than or equal to −5 degrees).

Additionally, under the present embodiment, over the majority of the radial extent of each blade, the $\beta_1+\beta_2$ turning angle is positive. Moreover, the turning angle is greater than or equal to 45 degrees at the hub end of each blade. The turning angle is greater than or equal to 80 degrees at the mid-span of each blade. At the shroud end of each blade, the $\beta_1+\beta_2$ turning angle is greater than or equal to 45 degrees.

The chord line 261 (i.e., the line connecting the axial leading and trailing edges) has a positive angle of attack with respect to the downstream axial component 221, i.e., even though the leading-edge direction faces circumferentially upstream with respect to the axis of rotation, the chord line itself is angled circumferentially downstream with respect to the axis of rotation. In other words, the leading edge is circumferentially downstream of the axial trailing edge. This may vary in other embodiments.

The lower surface 241 of the blade of this embodiment is configured to be concave over substantially the full chord of the blade. Moreover, at the majority of radial locations, the lower surface is curved such that it has a range of locations 263 that are circumferentially downstream of both the axial leading edge and the axial trailing edge.

Outer Blade Curvature

As discussed above, the primary-scroll passageway 219 forms a spiral adapted to turn the exhaust gas so as to have a flow including both the downstream axial component 221 and the downstream circumferential component 223. At a design condition that is among the standard operating conditions, the angle between the overall flow direction and the axial component at the inlet forms an inlet flow angle at each radial location. This inlet flow angle would be zero if the overall flow direction were entirely axial. The inlet flow angle varies significantly across the radial extent of the passageway at the blade inlet (where the blade axial leading edges are). Thus, at the design condition, the flow at the blades is characterized by an inlet angle distribution across the radial extent of the blades. This inlet angle distribution might vary by 20 degrees or more.

As was also discussed above, the leading-edge direction angle $\beta_1$ varies over the span of the blade. The blade is configured such that the variation of the leading-edge direction angle matches the inlet angle distribution (at the design condition), and thus might vary by 20 degrees or more. As a result, when the turbine is operating at the design condition, the full length of the axial leading edges will face in leading-edge directions 253 that are parallel to the inlet flow they are receiving (i.e., the inlet flow angle equals the leading-edge direction angle $\beta_1$).

Figure 7:
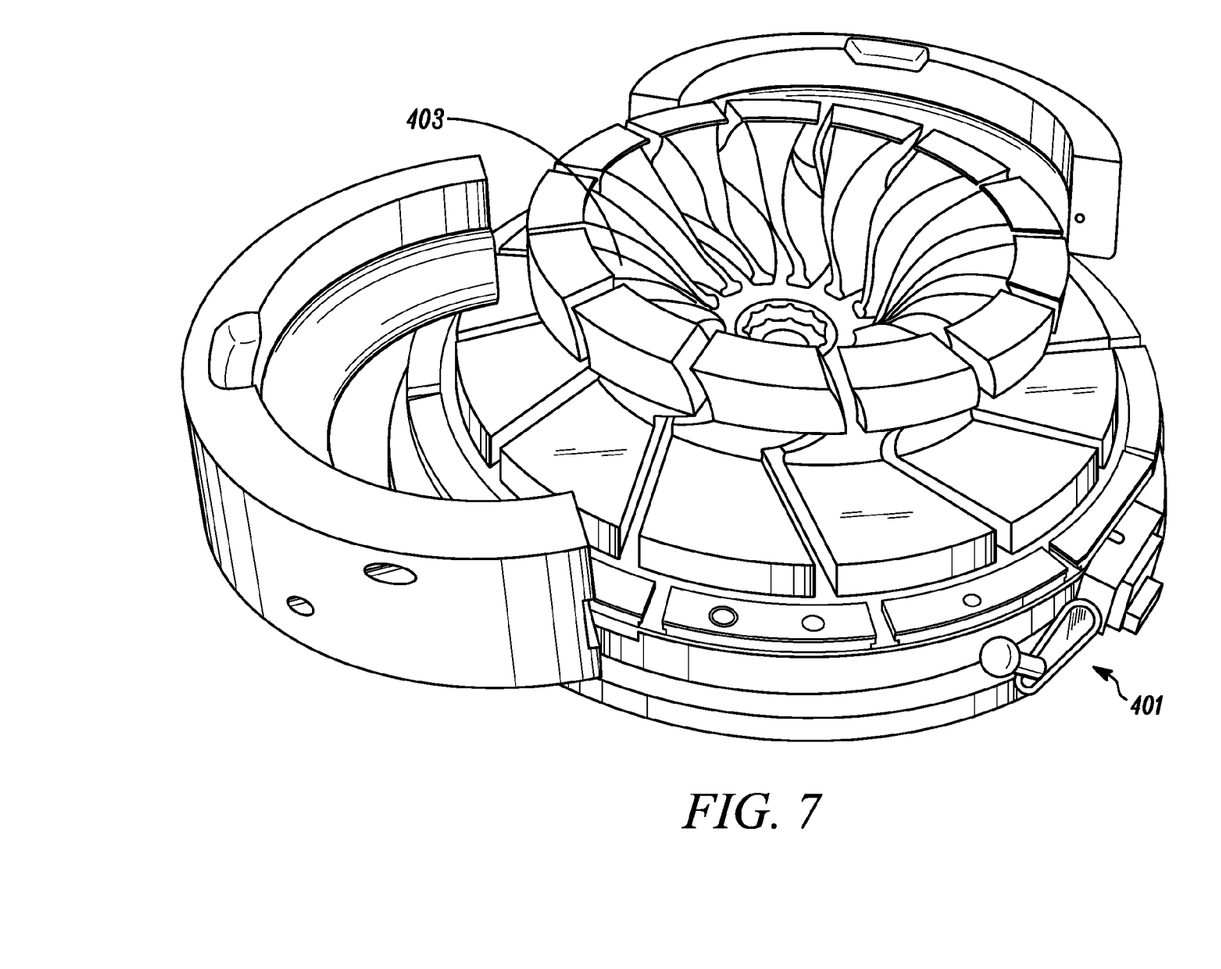
FIG. 7 is a plan view of a casting mold.

With reference to FIG. 7, for mass production it is desirable to have automotive turbine wheels made as cast parts. In this process, wax is poured into a casting mold 401 to form a wax model of the wheel. The casting mold includes a plurality of mold pieces 403 shaped as the spaces between each pair of consecutive blades. When the wax is solidified, each of the plurality of mold pieces is pulled away from the wax model. The direction of pull must be between the radial directions that the consecutive blades extend. The wax model is then used to make a ceramic mold that can be used to pour an actual part.

The problem with casting an axial turbine wheel with a high inlet angle distribution is that the large variation in the leading-edge directions leads to blade shapes that prevent the plurality of mold pieces from being pulled from the wax model. More particularly, near the outer leading edge tips, the blades bend out far enough to block the pullability of mold pieces from between the blades (i.e., they block the ability to pull the mold pieces without harming the wax model). The present invention overcomes this problem using a unique blade shape that allows the pullability of mold pieces, albeit with a possible modest cost in performance.

Prior art axial turbines typically have straight axial leading edges over the radial span of the blades. One possible solution to making an axial turbine wheel that is pullable is to design a wheel that has a constant chord shape and length throughout the span of the blade, and that has no twist (i.e., it is completely stacked such that it is the same at any radial location). To get the leading edge direction angles correct, the axial leading edge is trimmed back at various spanwise locations until it faces in the right direction at each spanwise location. Due to the high variation in leading edge direction angle, this technique might lead to significantly reduced chord length at some spanwise (radial) locations.

With reference to FIGS. 4-8, the present axial leading edge 245 forms a substantially straight leading-edge line 411 that extends from the radially inner hub end 273 to roughly 50% of the span (i.e., half way between the radially inner hub end and the radially outer tip end 275). This leading-edge line extends in an approximately (though not precisely) radial direction. The mold pieces 403 must be pulled in a pull direction that extends between the axial leading edge lines for each pair of consecutive blades. In the outer 50% of the blade span, the axial leading edge follows a three-dimensional leading edge curvature resulting from a complex blade shape on the outer and forward portion of the blade.

More particularly, the outer axial three-dimensional leading edge curvature includes an axially downstream curvature component 413 and a non-radial, circumferential curvature component 415. For the purposes of this application, the axial downstream curvature component 413 is defined as the curvature that is visible in (i.e., curving within) a downstream-curvature-plane defined by the leading-edge direction 253 vectors of the substantially straight leading-edge line 411 in the immediate vicinity of the outer axial three-dimensional leading edge curvature. The axial downstream curvature component 413 causes the blade to have a shorter chord length, similar to the trimmed-back axial leading edge described above.

For the purposes of this application, the circumferential curvature component 415 is defined as the curvature that is visible in (i.e., curving within) a circumferential-curvature-plane that contains the substantially straight leading-edge line 411, and is normal to the leading-edge direction 253 vectors of the substantially straight leading-edge line 411 in the immediate vicinity of the outer axial three-dimensional leading edge curvature. The circumferential curvature component 415 reduces the amount that the outer leading edge tips extend into the path of the pullability direction, and thus provides for improved pullability.

Because the circumferential curvature component provides for improved pullability, less of an axially downstream curvature component is required for pullability (as compared to using axially downstream curvature without circumferential curvature), thus minimizing the loss of chord length and its resulting reduction in effectiveness. As a result, the complex blade shape provides for the full length of the axial leading edges to face in leading-edge directions 253 that are parallel to the inlet flow that they receive when the turbine is operating at the design condition, while allowing mold piece pullability, and while reducing or minimizing chord length reductions. Thus, each blade's leading edge curvature is configured to provide adequate clearance between the blade and adjacent blades such that casting molds configured to cast the blades can be pulled from between the blades without deforming the casting molds.

Figure 8:
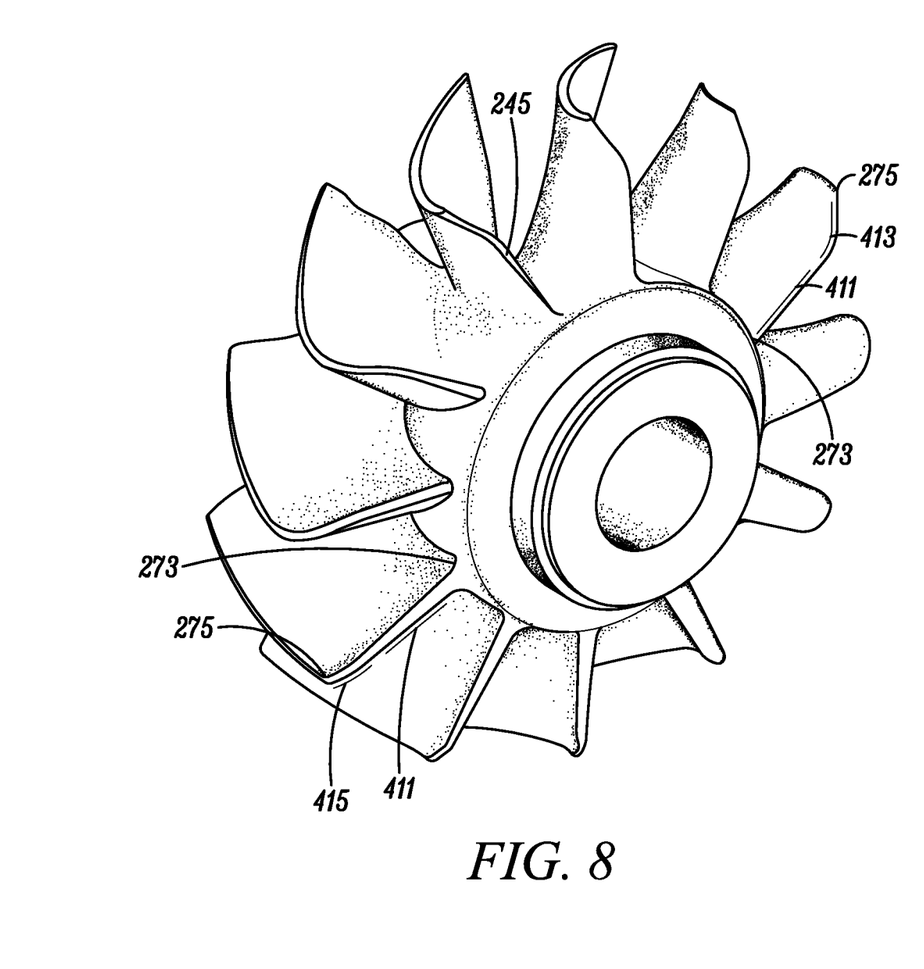
FIG. 8 is a different perspective view of the turbine wheel depicted in FIGS. 2 and 6.
Figure 9:
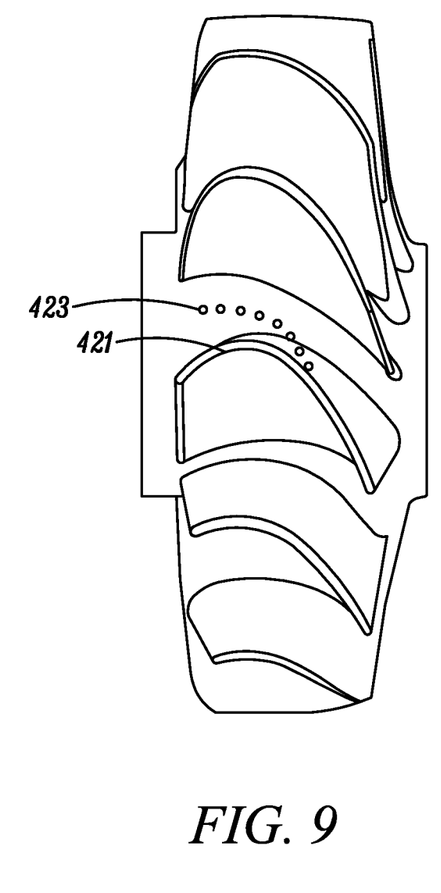
FIG. 9 is a plan view of the turbine wheel in FIG. 2.

With reference to FIGS. 7-9, the leading edge curvature provides for the outer end 421 of the axial leading edge to be more stacked over the inner portions of the blade, as compared to where the tip would be 423 if the leading edge were straight and had the same leading-edge directions. In the outer 50% of the blade span, the airfoil includes chord shape modifications between the axial leading edge and the half chord (as compared to the airfoils at inner portions of the blade span) that adapt to the circumferential curvature 415. As a result of the curved leading edge and resulting chord, the blade is more stacked than a blade coming from a straight leading edge with the same leading-edge directions (i.e., the outer portions are closer to being directly radially outside of the inner portions). This stacking provides for one or more angles at which a mold piece can be pulled without harming a wax mold.

Static Pressure Drop

A key feature of the present embodiment of the invention is that it provides the inertial advantages of a typical axial turbine wheel (having a lower rotational moment of inertia than an equivalent radial turbine wheel), while it greatly enhances the ability of the axial turbine to extract the energy of the exhaust gas stream. To accomplish this, as previously suggested, the present embodiment is provided with a volute that uses conservation of angular momentum to efficiently accelerate the exhaust gas stream and convert a significant portion of the total pressure in the exhaust gas stream from static pressure to dynamic pressure, and further to provide the accelerated exhaust gas stream to an axial turbine wheel at a significant angle.

The turbine blade is configured to extract a significant portion of the energy of the dynamic pressure from the flow, but not to significantly change the static pressure of the flow. As a result of the volute converting a significant portion of the static pressure to dynamic pressure, and of the wheel extracting most of the dynamic pressure without changing the static pressure of the airstream, the turbine extracts a large percentage of the energy in the exhaust gas stream without receiving a significant axial load. A typical embodiment of the invention will be characterized by a static pressure change across the turbine wheel blades of less than ±20% of the static outlet turbine pressure across the turbine for at least some operating conditions of the range of standard operating conditions, thereby causing very little axial force to be applied to the turbine wheel. More particularly, the turbine is configured to limit the static pressure upstream of the wheel near the wheel hub to a value that is not greater than 120% of the turbine outlet static pressure, i.e. the pressures differ at the most by 20% of the outlet pressure. Some embodiments of the invention are characterized by substantially no static pressure drops across the rotor, thereby causing only a negligible axial force on the turbine wheel.

Wheel Hub

Figure 6:
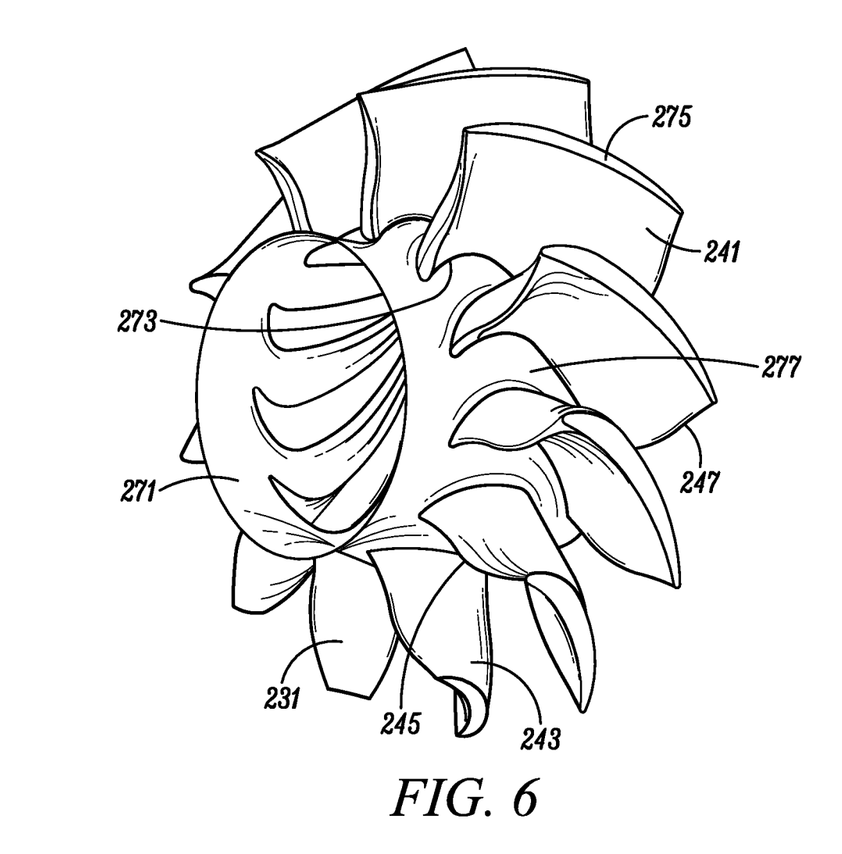
FIG. 6 is a perspective view of the turbine wheel depicted in FIG. 2.

With reference to FIGS. 5 & 6, the radial size of the turbine wheel hub 271 varies along the blade inner hub end 273 from the axial leading edge 245 of each blade 231 to the axial trailing edge 247 of each blade, and it is uniform around the circumference. More particularly, the hub is radially larger at the axial leading edge than it is at the axial trailing edge, and the hub is radially larger at an intermediate axial location between the axial leading edge and the axial trailing edge than it is at either the axial leading edge or the axial trailing edge. This increase in thickness forms a smoothly continuous hump 277 that is axially close to the range of locations 263 on the blade lower surface 241 that are circumferentially downstream of both the axial leading edge and the axial trailing edge (i.e., where the median camber is parallel to the axial component of the flow).

The hump 277 is provided in a location in which significant diffusion occurs, and it prevents the diffusion from exceeding a critical level at which flow separation might occur. The potential for this problem is uniquely substantial because of the unique size and shape of the blades and the high level of kinetic energy of the flow. Because use of the hump helps avoid flow separation, the hump provides for improved efficiency over a similar wheel that lacks the hump.

Axially Balanced Compressor

With reference to FIG. 2, the compressor housing 207 and compressor wheel 213 form a dual, parallel, radial compressor. More particularly, the compressor wheel has back-to-back oriented impeller blades. A first set of impeller blades 301 are oriented in a conventional configuration with an inlet facing axially outward (away from the turbine) to receive air from that direction. A second set of impeller blades 303 are oriented in a reverse configuration with an inlet facing axially inward (toward the turbine) to receive air brought in tangentially and turned to travel axially into the second set of impeller blades. The first and second set of impeller blades can be manufactured in the form of a single, integral wheel, e.g., as illustrated, or may comprise an assembly of a plurality of parts.

The compressor housing 207 is configured to direct inlet air to each set of compressor blades in parallel, and to direct the passage of pressurized gas from each compressor. In this embodiment, the compressor housing comprises two separate axially positioned air inlets; namely, a first air inlet passage 305, that is positioned adjacent an end of the compressor housing to pass inlet air in an axial direction to the first compressor blades 301, and a second air inlet passage 307 that is separate from the first air inlet passage 305. Pressurized air that is provided by the compressor wheel 213 is directed radially from each set of impeller blades 301 and 303 through a single passage 311 to a compressor volute 313.

This dual-path, parallel, radial compressor configuration, while typically being less efficient than a comparable single-path radial compressor, will operate at higher speeds and might produce substantially no axial loading in steady state operation. The higher operating speeds will typically better match the operational speeds of the axial turbine.

Synergies

The configuration of the present embodiment is significant for a number of reasons, and it is particularly effective for overcoming the efficiency limitations that limit the effectiveness of turbochargers on small gasoline powered engines, where the practical limitations of conventional axial turbines render them relatively ineffective for practical and efficient use.

The present invention provides an effective turbine with large blades that can be efficiently manufactured, even in small sizes. The comparatively large size and small number of axial turbine blades are well suited to casting in small sizes when smaller blades might be too small for conventional casting techniques. Moreover, the unique outer blade shape allows for the blades to be cast parts despite the high variation in leading-edge direction angle $\beta_1$. The high speed flow and large blades do not require manufacturing tolerances that may be limiting when applied to a very small turbine.

Singularly, the use of either a no-axial-load turbine or a no-axial load compressor is less efficient than their conventional axially loaded counterpart. Moreover, turbines and compressors are typically configured to have partially offsetting axial loads. Although these loads are far from perfectly matched, they do provide at least some relief from axial loads. If only one component (i.e., either the turbine or the compressor) creates no axial load, the remaining load from the other component is not partially offset, and even greater axial loads occur, requiring an even larger thrust bearing.

In the present invention, a no-axial-load compressor is combined with a no-axial-load turbine, allowing for the use of much more efficient thrust bearings. It is believed that in some embodiments the thrust load requirements may be as small as only 20% of the conventional counterparts. Bearings configured to carry such small loads can be adapted to be substantially more energy efficient. As a result, despite the potentially lower efficiencies of some of the system components, the overall system efficiency of the turbocharger may be significantly higher than in a conventional counterpart.

Other Aspects

While many conventional turbochargers are designed to produce no downstream swirl, some embodiments of the present invention may be configured with blades that produce either negative or even positive swirl. In designing a turbine under the present invention, the production of downstream swirl might be considered of less interest than in the efficient extraction of energy while producing little or no axial loading.

It is to be understood that the invention comprises apparatus and methods for designing and producing the inserts, as well as for the turbines and turbochargers themselves. Additionally, the various embodiments of the invention can incorporate various combinations of the features described above. In short, the above disclosed features can be combined in a wide variety of configurations within the anticipated scope of the invention.

For example, while the above-described embodiment is configured as a forward-flow turbocharger (i.e., the exhaust gas stream is streamed through the turbine wheel so as to come axially out the end of the turbocharger), other embodiments may be configured with a reverse flow in which the exhaust gas stream passes through the turbine wheel in a direction toward the compressor. Such a configuration, while it might not fit in the standard spaces allotted for internal combustion engine turbochargers, exposes the bearing housing to less heat and pressure. Also, while the described embodiment uses a wheel with cantilevered (i.e., free-ended) blades that are radially surrounded by an unmoving housing shroud, other embodiments employing a shrouded wheel (i.e., a wheel having an integral shroud that surrounds the blades and rotates with them) is within the scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A turbocharger configured to receive an exhaust gas stream from an engine configured to operate over a range of standard operating conditions, and to compress input air into a pressurized air stream, comprising:

a turbocharger housing including a turbine housing; and
a rotor configured to rotate within the turbocharger housing along an axis of rotation, the rotor including an axial turbine wheel, a compressor wheel, and a shaft extending along the axis of rotation and connecting the turbine wheel to the compressor wheel;
wherein the turbine wheel is configured with a hub, and with a plurality of axial turbine blades configured to drive the rotor in rotation around the axis of rotation when the turbocharger receives the exhaust gas stream from the engine, each blade having an axial leading edge, an axial trailing edge, a hub end, and a tip end opposite the hub end;
wherein the axial leading edge of each blade is characterized by a leading edge curvature near the hub end, the leading edge curvature including a downstream curvature component;
wherein the turbine housing forms an inwardly spiraling turbine primary-scroll passageway that turns in an axial direction, the primary-scroll passageway being configured to provide the exhaust gas stream to the blade axial leading edges at an inlet angle distribution during a design condition of the standard operating conditions;
wherein the axial leading edge of each blade is characterized by a distribution of leading edge blade angles that match the inlet angle distribution across the leading edge of the blade;
wherein the axial leading edge of each blade is characterized by a leading-edge direction angle, and wherein the leading-edge direction angle varies by at least 20 degrees over the span of each blade; and
wherein the axially leading edge forms a straight line from a leading edge hub end to a 50% span.

2. A turbocharger configured to receive an exhaust gas stream from an engine configured to operate over a range of standard operating conditions, and to compress input air into a pressurized air stream, comprising:

a turbocharger housing including a turbine housing; and
a rotor configured to rotate within the turbocharger housing along an axis of rotation, the rotor including an axial turbine wheel, a compressor wheel, and a shaft extending along the axis of rotation and connecting the turbine wheel to the compressor wheel;
wherein the turbine wheel is configured with a hub, and with a plurality of axial turbine blades configured to drive the rotor in rotation around the axis of rotation when the turbocharger receives the exhaust gas stream from the engine, each blade having an axial leading edge, an axial trailing edge, a hub end, and a tip end opposite the hub end;
wherein the axial leading edge of each blade is characterized by a leading edge curvature near the hub end, the leading edge curvature including a downstream curvature component;
wherein the leading edge curvature includes a circumferential curvature component;
wherein the turbine housing forms an inwardly spiraling turbine primary-scroll passageway that turns in an axial direction, the primary-scroll passageway being configured to provide the exhaust gas stream to the blade axial leading edges at an inlet angle distribution during a design condition of the standard operating conditions;
wherein the axial leading edge of each blade is characterized by a distribution of leading edge blade angles that match the inlet angle distribution across the leading edge of the blade;
wherein the axial leading edge of each blade is characterized by a leading-edge direction angle, and wherein the leading-edge direction angle varies by at least 20 degrees over the span of each blade; and
wherein the axially leading edge forms a straight line from a leading edge hub end to a 50% span.

3. A turbocharger configured to receive an exhaust gas stream from an engine configured to operate over a range of standard operating conditions, and to compress input air into a pressurized air stream, comprising:

a turbocharger housing including a turbine housing; and
a rotor configured to rotate within the turbocharger housing along an axis of rotation, the rotor including an axial turbine wheel, a compressor wheel, and a shaft extending along the axis of rotation and connecting the turbine wheel to the compressor wheel;
wherein the turbine wheel is configured with a hub, and with a plurality of axial turbine blades configured to drive the rotor in rotation around the axis of rotation when the turbocharger receives the exhaust gas stream from the engine, each blade having an axial leading edge, an axial trailing edge, a hub end, and a tip end opposite the hub end;
wherein the axial leading edge of each blade is characterized by a leading edge curvature near the hub end, the leading edge curvature including a downstream curvature component;
wherein each blade's leading edge curvature is configured to provide adequate clearance between the blade and adjacent blades such that casting molds configured to cast the blades can be pulled from between the blades without deforming the casting molds;
wherein the turbine housing forms an inwardly spiraling turbine primary-scroll passageway that turns in an axial direction, the primary-scroll passageway being configured to provide the exhaust gas stream to the blade axial leading edges at an inlet angle distribution during a design condition of the standard operating conditions;
wherein the axial leading edge of each blade is characterized by a distribution of leading edge blade angles that match the inlet angle distribution across the leading edge of the blade;
wherein the axial leading edge of each blade is characterized by a leading-edge direction angle, and wherein the leading-edge direction angle varies by at least 20 degrees over the span of each blade; and wherein the axially leading edge forms a straight line from a leading edge hub end to a 50% span.

4. A turbocharger configured to receive an exhaust gas stream from an engine configured to operate over a range of standard operating conditions, and to compress input air into a pressurized air stream, comprising:

a turbocharger housing including a turbine housing; and a rotor configured to rotate within the turbocharger housing along an axis of rotation, the rotor including an axial turbine wheel, a compressor wheel, and a shaft extending along the axis of rotation and connecting the turbine wheel to the compressor wheel;

wherein the turbine wheel is configured with a hub, and with a plurality of axial turbine blades configured to drive the rotor in rotation around the axis of rotation when the turbocharger receives the exhaust gas stream from the engine, each blade having an axial leading edge, an axial trailing edge, a hub end, and a tip end opposite the hub end;

wherein the axial leading edge of each blade is characterized by a leading edge curvature near the hub end, the leading edge curvature including a downstream curvature component;

wherein the leading edge curvature includes a circumferential curvature component;

wherein each blade's leading edge curvature is configured to provide adequate clearance between the blade and adjacent blades such that casting molds configured to cast the blades can be pulled from between the blades without deforming the casting molds;

wherein the turbine housing forms an inwardly spiraling turbine primary-scroll passageway that turns in an axial direction, the primary-scroll passageway being configured to provide the exhaust gas stream to the blade axial leading edges at an inlet angle distribution during a design condition of the standard operating conditions;

wherein the axial leading edge of each blade is characterized by a distribution of leading edge blade angles that match the inlet angle distribution across the leading edge of the blade;

wherein the axial leading edge of each blade is characterized by a leading-edge direction angle, and wherein the leading-edge direction angle varies by at least 20 degrees over the span of each blade; and wherein the axially leading edge forms a straight line from a leading edge hub end to a 50% span.

\* \* \* \* \*